United States Patent
McCarthy et al.

(10) Patent No.: US 7,760,372 B2
(45) Date of Patent: Jul. 20, 2010

(54) METHOD FOR AUTOMATED DOCUMENT SELECTION

(75) Inventors: Ann L. McCarthy, Pittsford, NY (US); Karen M. Braun, Fairport, NY (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1526 days.

(21) Appl. No.: 11/032,898

(22) Filed: Jan. 11, 2005

(65) Prior Publication Data

US 2006/0152748 A1 Jul. 13, 2006

(51) Int. Cl.
G06F 3/12 (2006.01)
H04N 1/60 (2006.01)

(52) U.S. Cl. ...................... 358/1.13; 358/1.9
(58) Field of Classification Search ............... 358/1.13, 358/474, 471, 400, 1.1; 347/129, 112, 111
See application file for complete search history.

(56) References Cited

U.S. PATENT DOCUMENTS

| | | | |
|---|---|---|---|
| 4,941,057 A * | 7/1990 | Lehmbeck et al. ........ 358/443 |
| 5,333,069 A * | 7/1994 | Spence .................... 358/517 |
| 5,424,945 A | 6/1995 | Bell et al. |
| 5,442,778 A | 8/1995 | Pedersen et al. |
| 5,600,732 A | 2/1997 | Ott et al. |
| 5,659,766 A * | 8/1997 | Saund et al. ............... 704/9 |
| 5,687,250 A | 11/1997 | Curley et al. |
| 5,774,888 A * | 6/1998 | Light ......................... 707/1 |
| 5,937,084 A * | 8/1999 | Crabtree et al. ........... 382/137 |
| 5,963,641 A * | 10/1999 | Crandall et al. ........... 380/2 |
| 5,990,931 A * | 11/1999 | Nimri et al. ............. 348/14.08 |
| 6,247,011 B1 * | 6/2001 | Jecha et al. ................ 707/9 |
| 6,345,130 B1 | 2/2002 | Dahl |
| 6,571,000 B1 | 5/2003 | Rasmussen et al. |
| 6,581,056 B1 | 6/2003 | Rao |
| 6,671,405 B1 | 12/2003 | Savakis et al. |
| 6,748,097 B1 | 6/2004 | Gindele et al. |
| 6,795,580 B1 | 9/2004 | Janko et al. |
| 7,024,022 B2 | 4/2006 | Harrington et al. |

(Continued)

FOREIGN PATENT DOCUMENTS

EP 0986270 3/2000

(Continued)

OTHER PUBLICATIONS

Flightcheck 5 Professional—User Manual; Markzware, Inc.; c. 1993-2003 USPatent 5963641.

(Continued)

*Primary Examiner*—Gabriel I Garcia
(74) *Attorney, Agent, or Firm*—Duane C. Basch; Basch & Nickerson LLP

(57) ABSTRACT

Provided is a method for the automated selection of sample documents or pages from a large collection, and more particularly an application of the method in a proof presentment environment—where the method is employed for selection and review of representative or extreme pages from a large document, such as one scheduled for printing. The method characterizes pages or documents in a multi-dimensional vector space based upon a set of characteristics, and then uses clustering techniques to group the pages, enabling the selection of typical pages from the groups, outlier pages from extremes lying outside of the groups, or both typical and outlier pages.

13 Claims, 4 Drawing Sheets

U.S. PATENT DOCUMENTS

| | | | |
|---|---|---|---|
| 7,035,438 B2 | 4/2006 | Harrington et al. | |
| 7,035,439 B2 | 4/2006 | Harrington et al. | |
| 7,072,495 B2 | 7/2006 | Harrington et al. | |
| 7,092,551 B2 | 8/2006 | Harrington et al. | |
| 7,092,552 B2 | 8/2006 | Harrington et al. | |
| 7,095,877 B2 | 8/2006 | Harrington et al. | |
| 7,171,618 B2 | 1/2007 | Harrington et al. | |
| 7,184,168 B2 * | 2/2007 | Beckman et al. | 358/1.18 |
| 7,391,885 B2 | 6/2008 | Harrington et al. | |
| 7,451,140 B2 | 11/2008 | Purvis et al. | |
| 2002/0191219 A1 | 12/2002 | Bondy et al. | |
| 2003/0051216 A1 | 3/2003 | Hsu et al. | |
| 2003/0140307 A1 | 7/2003 | Bar-Yossef et al. | |
| 2003/0160975 A1 * | 8/2003 | Skurdal et al. | 358/1.2 |
| 2003/0202684 A1 | 10/2003 | Beckman et al. | |
| 2003/0229543 A1 | 12/2003 | Zimmerman et al. | |
| 2004/0039990 A1 | 2/2004 | Bakar et al. | |
| 2004/0066527 A1 | 4/2004 | Kloosterman et al. | |
| 2004/0068692 A1 | 4/2004 | Cho et al. | |
| 2004/0078337 A1 | 4/2004 | King et al. | |
| 2004/0151399 A1 | 8/2004 | Skurdal et al. | |
| 2006/0080311 A1 * | 4/2006 | Potok et al. | 707/5 |
| 2007/0061384 A1 | 3/2007 | Harrington et al. | |

FOREIGN PATENT DOCUMENTS

| | | |
|---|---|---|
| EP | 1109132 | 6/2001 |
| EP | 1168245 | 1/2002 |

OTHER PUBLICATIONS

Govindaraju et al.; Assessment of image quality to predict readability of documents; SPIE vol. 2660/333-342; 1996.

Shin et al.; Predicting customer preference from objective image quality metrics for monochrome document products; SPIE vol. 5294/155-164; 2004.

Engledrum; Image quality modeling: where are we?; IS&T's 1999 PICS Conference; 251-255.

* cited by examiner

METHOD FOR AUTOMATED DOCUMENT SELECTION

CROSS-REFERENCE TO RELATED APPLICATIONS

Reference is made to commonly-assigned, co-pending U.S. patent applications:

Application Ser. No. 10/880,841, entitled "SYSTEM AND METHOD FOR MEASURING AND QUANTIZING DOCUMENT QUALITY," by Steven J. Harrington et al., filed Jun. 30, 2004;

Application Ser. No. 10/881,792, entitled "SYSTEM AND METHOD FOR MEASURING AND QUANTIZING DOCUMENT QUALITY," by Steven J. Harrington et al., filed Jun. 30, 2004;

Application Ser. No. 10/880,840, entitled "SYSTEM AND METHOD FOR MEASURING AND QUANTIZING DOCUMENT QUALITY," by Steven J. Harrington et al., filed Jun. 30, 2004; and Application Ser. No. 11/032,746, entitled "METHOD FOR PROOFING VARIABLE INFORMATION DOCUMENT RUNS USING DOCUMENT QUALITIES," by Lisa Purvis et al., filed Jan. 11, 2005, the disclosure(s) of each of the above-identified applications being hereby incorporated by reference herein.

The method disclosed herein relates to the automated selection of sample documents or pages from a large collection, and more particularly to an application of the method in a proof printing environment where the method is employed for selection of representative or extreme pages from a large document scheduled for printing.

BACKGROUND AND SUMMARY

The following patents or publications are noted, and are hereby incorporated by reference in their entirety:

U.S. Pat. No. 6,581,056 to Rao et al., issued Jun. 17, 2003, describes an information retrieval system and method for conducting a content analysis on a collection of documents; and U.S. Pat. No. 5,442,778 to Pedersen et al., issued Aug. 15, 1995, teaches a Scatter-Gather browsing tool, and associated method, where a user is presented with descriptions of document groups selected from a document collection. Based upon the descriptions, the user can then selects one or more groups for further study, where the selected groups are then recombined or gathered and re-clustered and presented to the user.

Although the patents above indicate the use of clustering techniques to group documents on a network or database, it is believed that such patents were directed primarily to the textual content of documents, and not to other aspects or characteristics of the information associated with the document, particularly printing characteristics. Moreover, the patents did not proceed so far as to automatically select documents, or pages from documents, but were utilized to assist a user in the identification and review of such documents. The key distinction of the method disclosed herein is that the pages and/or documents are selected using visual appearance criteria—and are not selected as a function of information content.

Disclosed herein is a method for automatically selecting sample documents or pages from a large collection using estimated rendered visual appearance criteria. One particular application of such a method is for selection of one or more representative or extreme pages from a large document scheduled for printing, for proofing purposes. Other applications can include analysis of a large corpus of data within a knowledgebase, as a precursor to preparing the one or more transformations necessary to render the corpus of data to be suitable for presentment.

In accordance with one aspect of the method, characteristics of documents or pages are represented in a multidimensional vector space, and clustering techniques are used to group together similar pages. Characteristics may include content metadata such as color encoding descriptors and font names, or page information such as area coverage, font size, image count, etc., that are then represented and grouped. Typical pages can be chosen from the centers of identified clusters, whereas exceptional pages can be selected from cluster extrema. In this manner, both the quality of the majority and the quality risk of the outlier pages can be assessed. The multidimensional vector space can be tailored according to the application requirements. In the case of a pre-press review or proofing system, proofing requirements might dictate that the vector space be representative of printing characteristics (color imagery, layout, etc.) as will be described in more detail below.

It is anticipated that the described method will ease the task of visually proofing large and/or variable information documents, promising substantial savings in time and cost over the current manual proofing of large documents. As it is reasonable to print only selected pages for proofing purposes, and proof prints of every page may not be required, a combination of typical and extreme pages will suffice, and the described method may be employed to select representative or typical and exceptional pages for proofing. One embodiment of the method described is for production workflowsi (e.g., DigiPath, DocuSP, Enterprise Output Management System) and other workflow management systems—particularly those related to pre-press or pre-flight analysis, document creation and layout applications, variable imaging applications, and digital front ends.

Accordingly, a method is described for automatically selecting sample pages from a large document for proofing purposes. More specifically, the method characterizes pages in a multidimensional vector space and then uses a cluster-analysis technique to group the pages so that representative pages from at least one group (or a page not within a group) may be automatically selected for proofing.

Disclosed in an embodiment herein is a method for automated document subset selection from a stored body of knowledge, comprising the steps of: accessing the body of knowledge, including a plurality of documents therein; characterizing at least a portion of the body of knowledge in a characterization space; grouping the documents into a plurality of groups; and automatically selecting, based upon said grouping, a subset of the body of knowledge for presentment, including transform preparation for rendering and proofing.

Disclosed in another embodiment herein is a method for automated selection of proofing pages from a print job, comprising the steps of: receiving a multi-page document for printing; characterizing a plurality of pages of the multi-page document in a characterization space; grouping at least some of the plurality of pages into at least one group; and selecting, based upon the grouping, at least one page for presentment as a proof page.

Disclosed in yet another embodiment herein is, in electronic document processing, a method for pre-flight checking at least one electronic document intended for printing including the steps of: characterizing a plurality of pages of the document in a characterization space; grouping at least some of the plurality of pages into at least one group; and selecting, based upon the grouping, at least one page for presentment as a proof page.

Figure 1:
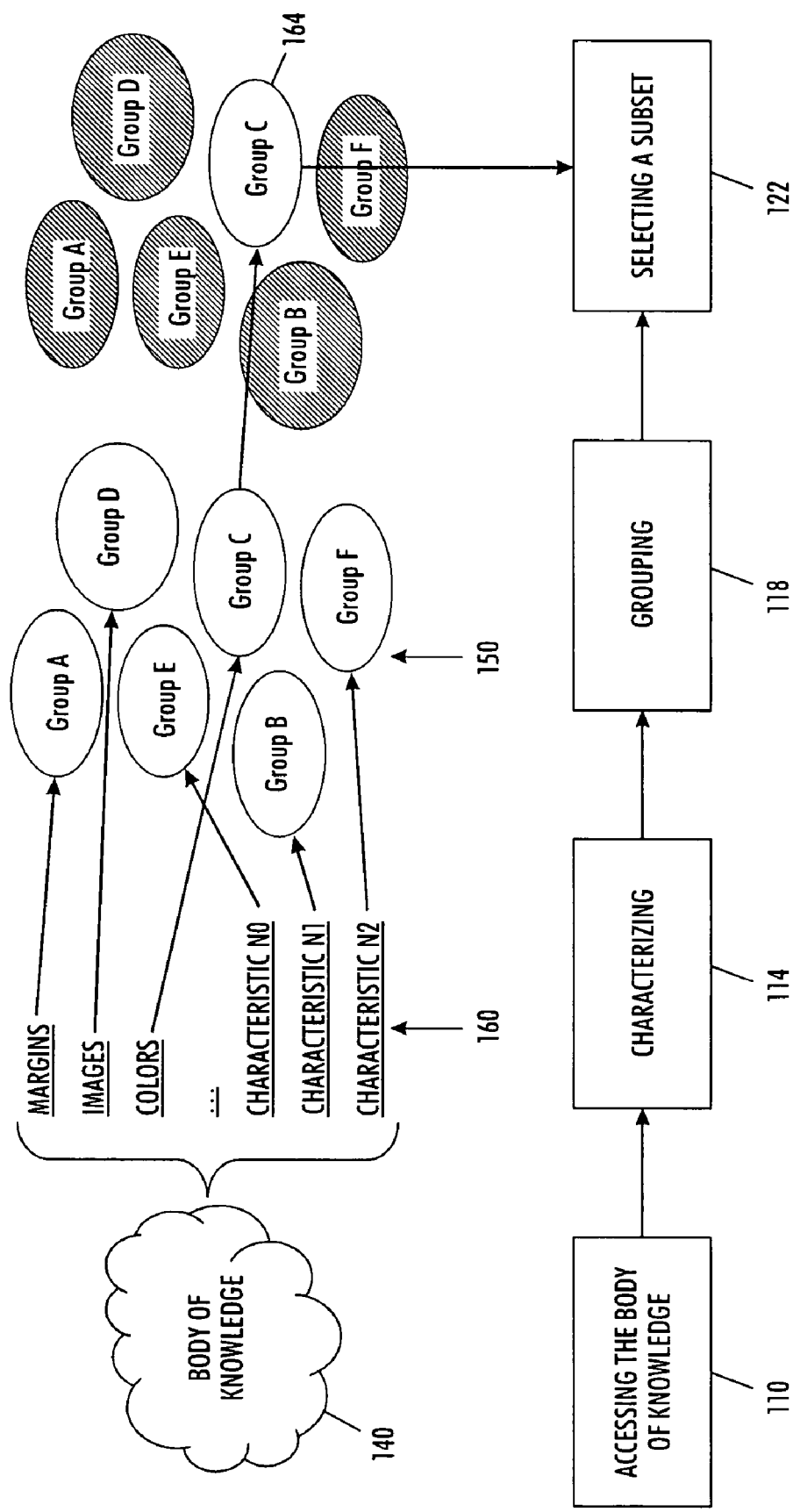
FIG. 1 is a general flow diagram illustrating steps of the disclosed method in association with the flow of information.

The following disclosure will be characterized in connection with a preferred embodiment, however, it will be understood that there is no intent to limit the disclosure or scope to the embodiment described. On the contrary, the intent is to cover all alternatives, modifications, and equivalents as may be included within the spirit and scope of the appended claims.

DETAILED DESCRIPTION

For a general understanding of the method and described embodiments, reference is made to the drawings. In the drawings, like reference numerals have been used throughout to designate identical elements. As used herein the term document is used not only to represent, what is typically understood as a single or multi-page collection, but also is intended to represent components of documents which may themselves be combined to produce a conventional document. Accordingly, unless otherwise indicated, the term "document" is intended to cover a broad range of possible items, from document components, to fully assembled, multi-page collections of information.

As will be further appreciated the method described herein can be carried out on a production or commercial printing system, and more particularly, on one or more processors associated with a commercial printing system. For example, the method can be implemented largely as a sequence of programmed operations carried out by a computer processor, such as Pentium® processor running a Microsoft® Windows-based operating system with 128 MB RAM or thereabout. Furthermore, the method described below may be implemented in association with preflight software (i.e., the Enfocus PITSTOP™ software, or possibly MARKZWARE™ Flightcheck Professional).

Referring to FIG. 1, there is depicted a flowchart and associated dataflow illustration representing the general steps in a method for automated document subset selection from a stored body of knowledge. As will be further described in accordance with a print workflow embodiment, the method comprises accessing, in step 110, a body of knowledge 140, including a plurality of documents therein. As noted above, the term "document" is intended to be construed broadly, and the body of knowledge may include single and multi-page documents as well as document components. Next, the pages are characterized at step 114, where the documents are analyzed and particular characteristics such as content appearance metadata (font name, image encoding, etc.), margins, colors and other page characteristics (N0, N1, . . . ) are similarly represented. In one embodiment, the characterization is accomplished with respect to a multidimensional characterization space represented as 150.

After the documents are characterized, they may be further associated or grouped with one another at step 118 using, for example, clustering techniques to form a plurality of groups 160. Finally, at step 122, one or more groups 164 may be selected, based upon said grouping, for presentment rendering transform preparation and proofing—where presentment rendering may include any of various means or methods for interpreting document and page appearance and rendering instructions, preparing rendering instructions, and transforming for presentment one or more documents from the selected group according to said rendering instructions.

More specifically, one aspect of the method contemplates the possibility of characterizing the group of documents within the body of knowledge based upon the transform required to render (e.g., print) the document. In other words, characterize and group documents according to the distinct transforms required for rendering and presentment (e.g., group together all pages containing a particular RGB color encoding), and select one of the group for proofing (e.g., testing the specific color rendering transformation that is required to modify the particular RGB colors for CMYK printing). Similarly, all pages containing a particular printer specific (e.g., CMYK) encoding could be grouped together, and one of the group selected and used to test the transformation (e.g., CMYK transformation to sRGB) required for web presentment. Such an aspect could, therefore, include in the selection of documents for proofing, an identified expectation to apply a distinct rendering transform in preparation for rendering or presentment. Similarly, the same aspect could be employed to "test" that the rendering transform selected is appropriate for the document, and the system may be employed to proof using the transform just to be sure. In this way, the proofing intent (as described with respect to FIG. 3) would include testing of the rendering transform for the selected group.

With respect to step 114, for characterizing at least a portion of the body of knowledge, the step would process each document in the body of knowledge. Moreover, the step would further include determining, for each document, a plurality of vectors to represent each of a plurality of characteristics of the documents, and representing each in a multi-dimensional vector space based upon the plurality of vectors.

Furthermore, relative to step 118, grouping the documents further includes analyzing clusters within the multidimensional vector space to determine characteristics common to each cluster and grouping those documents or pages having similar characteristics. And, the step (122) of automatically selecting a subset of the body of knowledge for presentment further comprises the step of identifying a representative document within a cluster. Alternatively, selection step 122 may identify an atypical document outside of a cluster. It should be appreciated that these alternatives are not necessarily mutually exclusive, and in certain circumstances, it may be desirable to select within and outside of a group or cluster, as will be described below.

An example of the general use of the disclosed method may be a web-based interface or application that presents a descriptions of items from a catalog, including product specifications, company information, etc. in response to a pre-specified criteria or the like. More specifically, product specification or other characteristics may be employed for the grouping of the catalog items, and then the selection of specific groups or members of the group completed to present the information to a user—via a display, print, etc.

Similarly, the system could be employed in the generation of web pages, where there could be a variety of web pages in the body of knowledge 140 and some subsets of those web pages could be automatically generated from databases of content. The proofing methodology described with respect to steps 110-122 could then be applied to the associated web portal to sample the look of the web pages that might be seen. As will be appreciated the use of the general method is, therefore, not limited to proof printing, but may also cover cases where selections are presented in other forms, not limited to actual printing of pages/documents.

Figure 2:
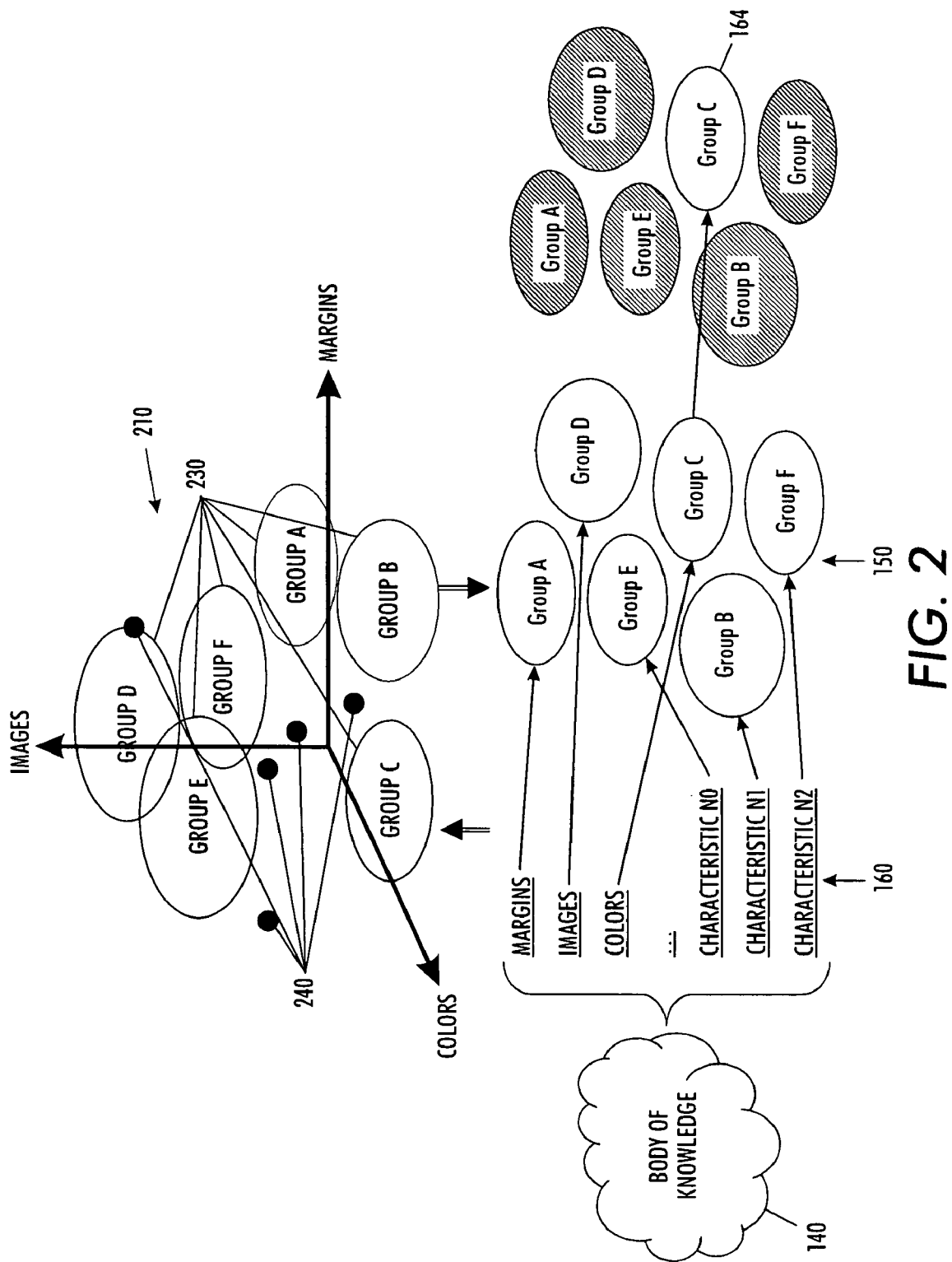
FIG. 2 is a representation of an exemplary data flow and clustering step of the method of FIG. 1.

Accordingly, FIGS. 1 and 2 illustrate a general method for automatically selecting sample pages from a large document for proofing purposes. The method characterizes pages in a multidimensional vector space 210 and then uses known cluster-analysis techniques to group the documents or pages (Groups A-F). For example, an agglomerative hierarchical clustering technique, such as a graph method, may be used. An initial pattern matrix (N×N matrix of similarity values) can be determined by extracting a maximum range of characteristic feature occurrences from the documents in the body of knowledge, and can be used to determine the usefulness of various characteristic features as clustering criteria before the clustering algorithm is initiated. Attention to the weights on the graph links can be used to control the resulting degree of cluster inclusiveness. The clustering method selected should allow for mixed discrete (alike or not alike) characteristic similarity assessment—perhaps as intermediate constraints, and continuous—similarity distance-based—characteristic similarity assessment. Given the agglomerative hierarchy of clusters, the best clustering for proofing or presentment transform preparation can be chosen via user preferences.

Typical documents can be chosen from the centers of the clustered groups 230. Exceptional documents 240, lying outside the clusters can be also determined by looking for the extremes in the chosen dimensions of the vector space, and/or by looking for document pages that lie far from cluster centers.

The characteristics used for the vector space can be parameters such as margin size, but in order to be applied to all pages, regardless of content, characteristics are better taken to be higher level document properties, such as area coverage, balance, average font size, image fraction, image count, color-rendering predictability, and so on. Vector space dimension parameters can be re-ordered and prioritized differently to satisfy the distinct needs of different proofing iterations. In another embodiment, the characteristics used to characterize pages or documents in a proofing implementation include the various characteristics set forth and measured or quantized by Harrington et al. and Purvis et al. in the cross-referenced applications incorporated by reference above.

In one useful scenario, a set of vector space dimensions might be comprised of dimensions corresponding to each of a) number of distinct font names, b) number of font styles, c) number of distinct Pantone colors, d) and number of raster image objects. In this case, the resulting four dimensional vector space could be used to identify components, pages or documents containing a maximum number of Pantone colors in combination with images, pages containing a variety of font names and styles, etc.

Figure 3:
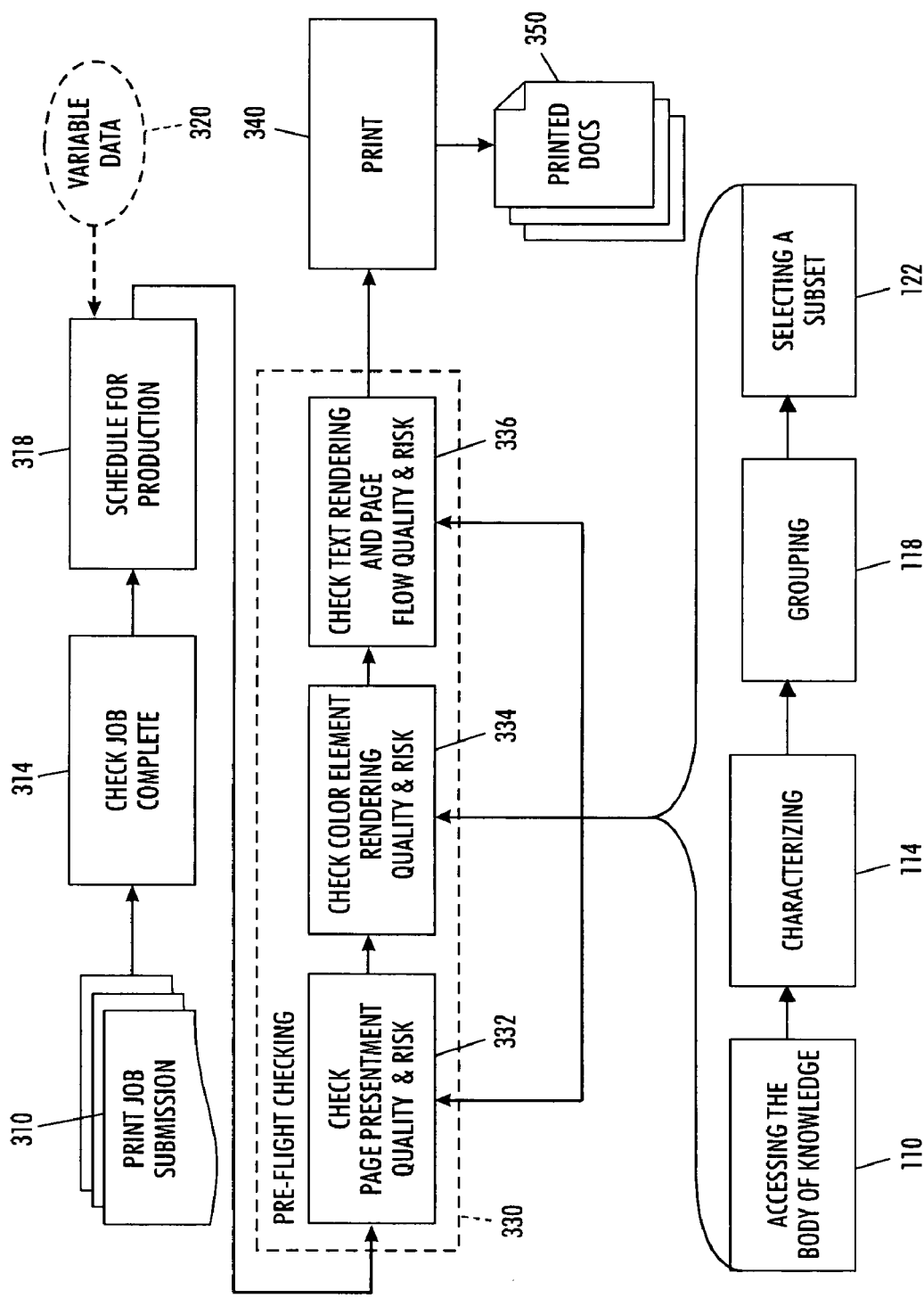
FIG. 3 is an exemplary workflow for a print proofing method.

Referring next to FIG. 3, there is depicted a method for preparing a document for printing, including pre-flight check of the document. In response to receiving a print job submission 310, the job is first checked to see if it is complete (e.g., includes all necessary information) at step 314 and is then scheduled for printing or production at step 318. Next, in pre-flight checking step 330, one or more of a plurality of checks (332, 334 and 336) are performed. In general, these steps employ the automated selection of proofing pages from a print job. More specifically, the checks include receiving a multi-page document as part of the print job, and then characterizing the pages of the multi-page document in a characterization space as described above (step 114). Once characterized, the pages are grouped (step 118) and selected (step 122) in accordance with the requirements of the particular check or proofing step being executed, typically such that pages at risk for rendering quality failures are identified.

Proofing of a document may take place in several iterations or passes, for example the steps set forth in 330. Moreover, proofing may or may not include actual printing of the document, or components thereof. In other words, although selected for proofing review, it may be possible to review the selected pages by various means of presentment, including visual display on electronic medium (e.g., displays, televisions). While one pass may involve inspection of every page of a document, some proofing passes may only require representative pages, or alternatively, pages with particular exceptional or extreme attributes. For example, an early proofing pass may be looking for properties that are expected to be common across many pages, and thus looking at representative pages is sufficient. Another proofing pass may be looking at properties that pertain to only a few pages. And, as described above, the characteristics may include the rendering transform in preparation for presentment, wherein the characterization and grouping include the ability to select documents having distinct rendering transforms.

The cross-referenced application to Purvis et al. suggests that document design qualities such as alignment, balance, and legibility could provide valuable information to the proofer, but further, extreme cases of these qualities might be used to select instances of a variable information document for proofing. In other words, using such qualities as alignment, balance, and legibility, the present method may be employed automatically select one or more pages representative of typical or extreme examples of such qualities.

A variable information document poses a similar problem where it is typically impractical to proof every possible page. Selecting instances of a variable information document is slightly different and may actually be a simpler problem, especially when the variable content substitution is constrained to a particular document layout. In this case all of the document instances are similar and a proof operation might seek the extreme rather than the representative cases.

On the other hand, when variable information is combined to create documents that do not conform to a single document layout (e.g., when automated document composition includes complex text reflow), then proofing both representative and extreme subsets of the possible instances can be of benefit. Examples of document design qualities are presented in the above-identified applications. These design qualities have the property that they are defined for any document content and style. They can be calculated for any arbitrary document. Some of these qualities are intended to be calculated for individual pages, while others can be employed on a page-by-page basis by treating each page as a one-page document.

Other qualities that are well defined for any page can be constructed as well. Such qualities are more useful than specific parameters such as image size or heading font that may have problems identifying pages for proofing if there are no images or headings. The method described herein further contemplates using qualities defined for any page (such as the design qualities) in the procedure for selecting representative pages. The qualities to be used in characterizing the pages are calculated for each page and a characterization vector for the page is formed from the quality values. Each page is thus represented by a point in a multidimensional characterization space based upon the qualities. Well known cluster analysis methods can then be applied to determine clusters or groups of points within the space. The calculation of clusters may also be configured to satisfy the purpose of a particular proofing iteration as described above and illustrated in FIGS. 2 and 3.

Figure 4:
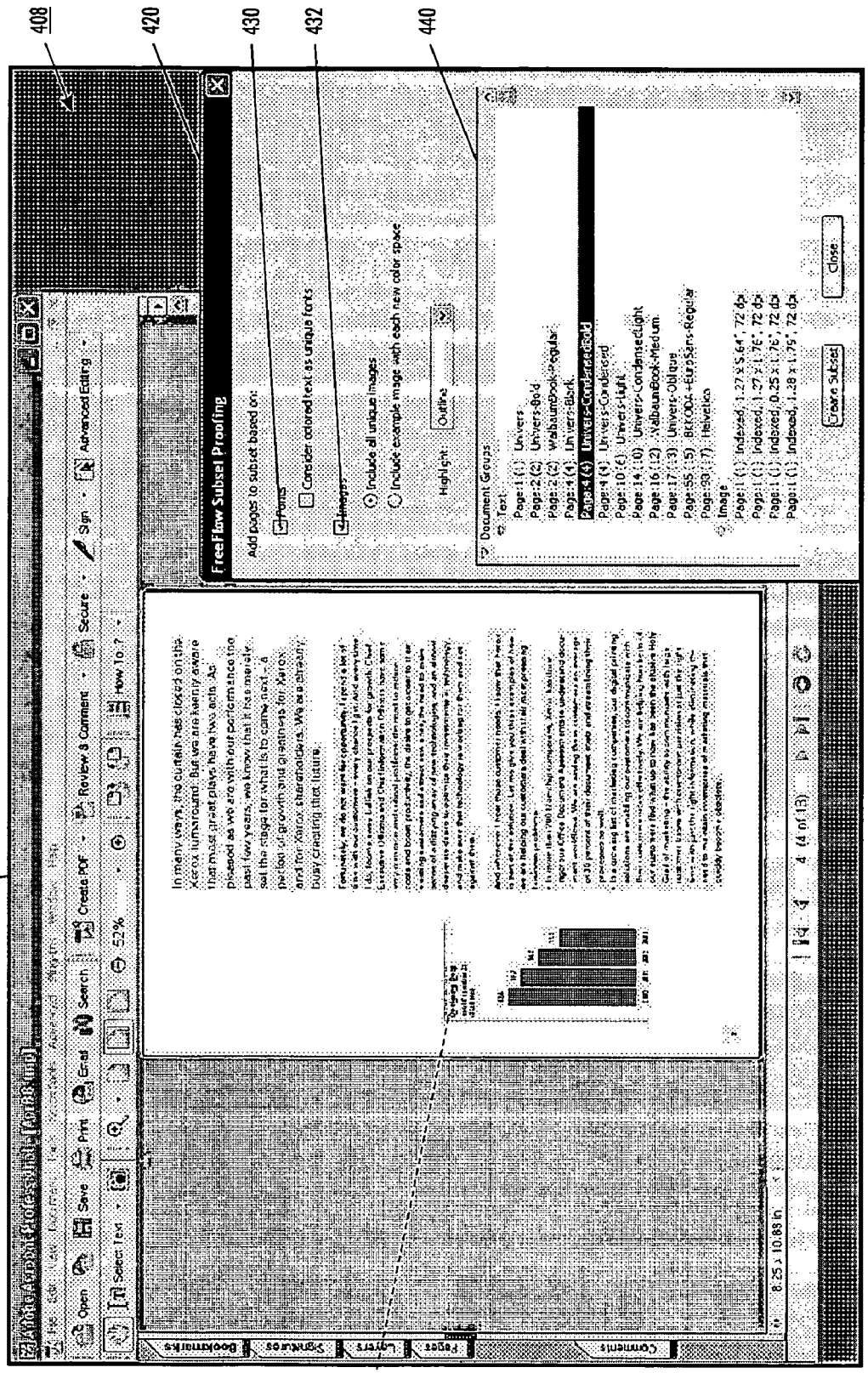
FIG. 4 is an exemplary illustration of a user interface for an embodiment illustrating aspects of the method described herein.

Referring next to FIG. 4, there is shown an exemplary user interface 408 that illustrates some aspects of the method described herein. More specifically, FIG. 4 shows an Adobe Acrobat® window 410 that was opened to review a PDF document such as the 100-page Xerox 2003 Annual report. Subsequently, the FreeFlow Subset Proofing add-in was initiated and dialog box 420 opened. To process the PDF of the annual report document, the objects within the PDF document file were reviewed and the occurrences of various object types (text fonts, font colors, images, etc.) were identified. In response to the user's selection of check boxes 430 and 432 (fonts and images, respectively) to indicate what was to be selected for proofing, the add-in software reviewed the PDF objects and identified the first occurrence of any new object meeting either of the selected criteria. The list within region 440 provides details as to the first occurrence of each item type (e.g., each new font type or color), and also provides a comprehensive listing of each document page (total of 18 pages) selected from the larger document for proofing purposes. Furthermore, the highlighted item in region 440 corresponds with displayed page 4.

In region 440, the first occurrence of each new font, and each unique image is represented and is employed for selection of the subset of pages to be used for proofing. In other words, the first time the font Univers-CondensedBold occurs is at page 4 of the PDF document, and is indicated within the dashed outline region 450. Although the example depicted utilizes a first-occurrence selection criteria to select pages for proofing, it will be appreciated that the afore-described cluster-based analysis of pages and documents to identify typical pages or extreme pages may be substituted. It is, however, possible to employ one or more user preferences, as set forth in dialog box 420, to facilitate proofing. For example, as indicated with respect to FIG. 3, the Fonts and Images checkboxes may be replaced with Layout, Image Quality and Text & Line-Art Content/Detail as may be considered to specify the type of proofing operation being conducted. Thus, predefined criteria for a particular proofing operation of proofing pass may be employed to determine the nature of document pages to be selected for proofing.

For example, referring again to FIG. 3, when developing a print job there are typically proofing steps in the workflow that confirm that the printed document will appear as expected. There may be several proofing iterations, where one proofing iteration checks that page presentment layout (e.g. geometric relationships between objects including margins, fonts, etc.) is correct, step 332; another proofing iteration that checks color element quality, step 334; and yet another proofing iteration that considers text rendering and page flow quality, step 336. When a document is large (e.g., tens of pages), visual evaluation of every page at every iteration would be costly and time consuming. Hence, the described method may be employed as a means of controlling and minimizing print quality risk, in that representative pages are and have been reviewed for pre-flight or proofing purposes before an entire large job is printed (step 340, prints 350). Further to the examples set forth above, it is also contemplated that the preflight checking steps may include an automated proof selection directed to characteristics including layout (e.g., margin size, balance, font, font size, font reflow, and alignment) and color reproduction (e.g., area coverage, image fraction, image count, color-rendering predictability).

Returning to FIG. 4, the dialog box 420 further illustrates the manner in which one or more pages of the document being submitted for proofing may be reviewed. In addition to automatically selecting pages for proofing, the method may further enable the display of such pages in an associated document review system. And, as illustrated by the outlining in region 450, the system may specifically indicate in the native document display software, the region or aspect of the page that was selected for particular proofing in the event that an atypical or extrema is noted relative to the page.

In summary, the methods described herein enable the automated selection of sample pages from a large document or body of knowledge for proofing purposes. More specifically, the method characterizes pages in a multidimensional vector space and then uses a cluster-analysis technique to group the pages so that representative pages from at least one group (and atypical pages with high quality risk not within a group) may be automatically selected for proofing.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for automated selection of proofing pages from a print job, comprising:
    receiving a multi-page document for printing;
    characterizing a plurality of pages of the multi-page document in a characterization space;
    grouping at least some of the plurality of pages into at least one group; and
    selecting, based upon the grouping, at least one but less than all pages in the multi-page document for presentment as proofing pages.

2. The method of claim 1, wherein selecting at least one page comprises selecting, from the group, a page that is representative of the group.

3. The method of claim 1, wherein selecting at least one page comprises selecting a page that is an outlier from at least one group.

4. The method of claim 1, wherein selecting at least one page comprises selecting a page from the group based upon its order of occurrence in the document.

5. A method for automated selection of proofing pages from a print job, comprising:
    receiving a multi-page document for printing;
    characterizing a plurality of pages of the multi-page document in a characterization space, wherein characterizing a plurality of pages, further comprises locating, in the characterization space, the position of a page as a function of the value of at least two document characteristics;
    grouping at least some of the plurality of pages into at least one group; and
    selecting, based upon the grouping, at least one page for presentment.

6. The method of claim 5, wherein the document characteristics include layout and color reproduction.

7. The method of claim 6, wherein the document layout characteristics are selected from the group consisting of margin size, balance, font, average font size, and alignment.

8. The method of claim 6, wherein the document color reproduction characteristics are selected from the group consisting of area coverage, image fraction, image count, and color-rendering predictability.

9. The method of claim 5, wherein the document characteristics include at least one font characteristic.

10. The method of claim 5, wherein the document characteristics include a rendering transform to be applied to the document in preparation for presentment.

11. The method of claim 5, wherein selecting, based upon the grouping, at least one page for presentment further includes printing the at least one page as a proof page.

12. A method for automated selection of proofing pages from a print job, comprising:
receiving a multi-page document for printing;
characterizing a plurality of pages of the multi-page document in a characterization space;
grouping at least some of the plurality of pages into at least one group;
selecting, based upon the grouping, at least one but less than all pages in the multi-page document for presentment as proofing pages; and
further comprising identifying the proofing intent and, completing the grouping in accordance with the proofing intent.

13. The method of claim 12, wherein the proofing intent further includes identification of at least one rendering transform for a group.

* * * * *